April 17, 1962  T. R. E. KRESSMAN  3,030,318
ION-EXCHANGE RESINS
Filed Dec. 7, 1959
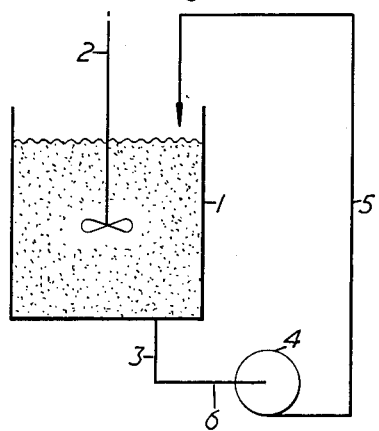
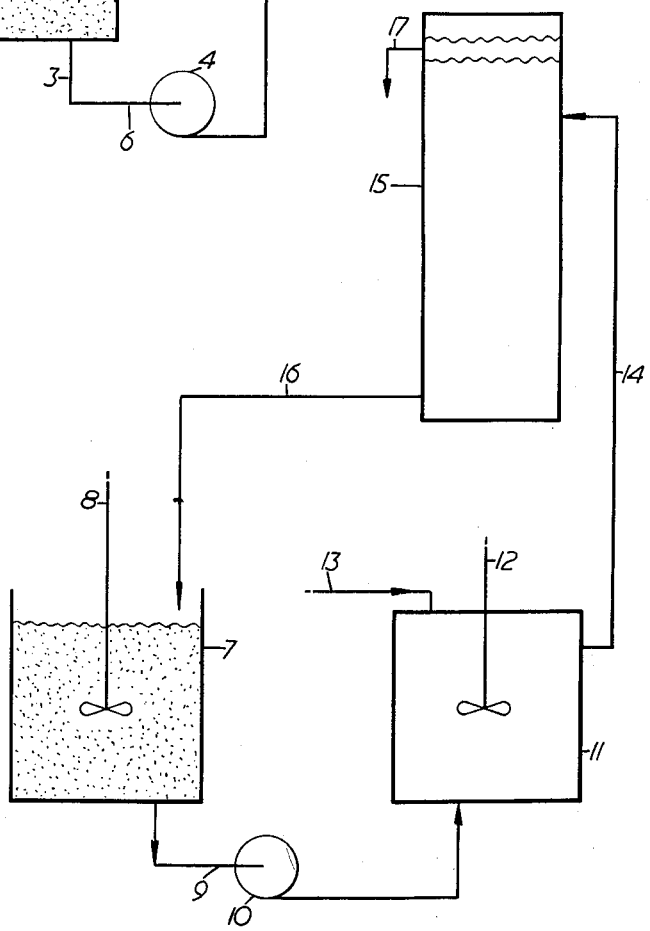
Inventor
THEODORE ROGER ERNEST KRESSMAN
By Bailey, Stephens & Huettig
Attorneys

3,030,318
ION-EXCHANGE RESINS
Theodore Roger Ernest Kressman, Watford, England, assignor to The Permutit Company Limited
Filed Dec. 7, 1959, Ser. No. 857,694
Claims priority, application Great Britain Dec. 8, 1958
16 Claims. (Cl. 260—2.2)

This invention relates to the hydration of bodies of ion-exchange resins, for example beads or other particles for use in ion-exchange processes or homogeneous membranes for use in electrodialysis. One way of making bodies of ion-exchange resins is to introduce ion-exchange groups into pre-formed bodies of a suitable polymer. Since the polymer is generally hydrophobic the reaction is carried out under essentially non-aqueous conditions and the bodies of resin must be hydrated before use. It is difficult to do this without cracking them. If for example the bodies are immersed directly in water after separation from the bulk of the reaction mixture violent osmotic changes take place, accompanied by swelling of the bodies, and the bodies will shatter. Again the action of the water on the resin or on excess reaction mixture absorbed in or adhering to the resin may also lead to considerable evolution of heat and consequent shattering.

Various methods have been proposed to avoid these difficulties, but none is wholly satisfactory. For example, the resin bodies, after separation from the reaction mixture, may be immersed in a concentrated salt solution, say a saturated sodium sulphate solution, which is then progressively diluted with water. In another method that has been used for hydrating beads of cross-linked polystyrene after they have been sulphonated the beads are taken from the sulphonating vessel, put into concentrated sulphuric acid, and then transferred successively to baths of sulphuric acid of progressively lower concentration, finally being put into water. The first method, however, does ont yield satisfactory crack-free bodies while the second method, although being better in this respect, is inconvenient in practice since it requires the use of large volumes of sulphuric acid contained in many vessels.

I have now discovered that bodies of ion-exchange resin can be very effectively hydrated by bringing them into contact with a water-containing inert organic solvent. The water may be present in the solvent in solution or as a dispersion, or if desired partly dissolved and partly dispersed. To obtain the best results the resin should be separated from any reaction mixture used to introduce ion-exchange groups before being brought into contact with the solvent.

The solvent must be both chemically and physically inert to the resin, that is to say it must neither react chemically with the resin nor itself cause any substantial amount of cracking of the resin bodies. The tendency to crack depends upon the nature of the resin, but generally with a given resin the less hydrophilic the solvent, i.e. the lower the solubility of water in it, the less is its tendency to produce cracking. The hydrophobic solvents ethylene dichloride and methylene chloride have been found to be particularly suitable from this point of view. The suitability of a solvent for use with a particular resin should therefore be determined in advance. The following table gives some examples of solvents that have been used, together with their solubility for water at room temperature.

TABLE

| Solvent: | Solubility of water in solvent, w./w. |
|---|---|
| Methyl n-butyl ketone | 3.7 |
| Methyl iso-butyl ketone | 1.9 |
| Iso-butyl acetate | 1.85 |
| Nitromethane | 1.85 |
| Cyclohexanol | 11.0 |
| Ethylene dichloride | 0.15 |
| Methylene chloride | Small |
| Tetrahydrofuran | Infinite |

All these solvents have been found wholly suitable for use with sulphonated cross-linked polystyrene resins. With a sulphonated cross-linked acrylate resin, however, a very hydrophilic solvent, e.g. tetrahydrofuran or cyclohexanol, may cause cracking even when water-free. The use of these solvents to introduce water into such a resin tends to give a larger proportion of broken particles than solvents in which water is less soluble, and if completely crack-free beads of resin are required a highly hydrophobic solvent such as ethylene dichloride should be used.

In general the hydration should be carried out quite slowly, although some resins can tolerate a more rapid hydration than others. For example a sulphonated cross-linked polystyrene can be hydrated in as little as 1½ hours, but usually a longer time is required, for example 10–20 hours. The rate of hydration depends amongst other factors on the proportion of water contained in the solvent, and the maximum proportion of water that can be used in the solvent will thus depend on the resin. If the water is in solution in the solvent this maximum will of course also be limited by its solubility in the solvent, but higher proportions can be achieved by dispersing the water in the solvent, preferably as a stable emulsion. Less solvent is then required to incorporate a given amount of water in the resin.

To assist in the formation of an emulsion an emulsifying agent of the kind used for producing water-in-oil emulsions may be added to the solvent, particularly when using solvents, e.g. ethylene dichloride, which do not readily form stable water-in-oil type emulsions. I find however that the resin itself often contains substances formed by side reactions during the introduction of the ion-exchange groups which act as emulsifying agents, and the amount of these substances may be sufficient to render further addition of such agents unnecessary.

The process is particularly suitable for the hydration of beads or other small particles of resin, and various ways of carrying it out will now be described in more detail with reference to the accompanying drawings, in which FIGURES 1 and 2 show diagrammatically two forms of apparatus in which water-containing solvent is brought into contact with resin particles.

One suitable way of carrying out the invention is to form the resin beads or particles into a column through which the water-containing solvent is caused to flow. Preferably, however, the resin beads or particles are stirred in a bath of the water-containing solvent, which is replaced as it becomes depleted in water. Advantageously the depleted solvent is replenished in water and continuously returned to the contacting vessel. Water may for example be fed into the solvent at the inlet of a centrifugal pump used for the circulation, the agitation by the pump serving to disperse the water in the solvent and form an emulsion, if necessary with the aid of an emulsifying agent. Thus in the apparatus shown in FIGURE 1 particles of resin are suspended in an open contacting vessel 1 provided with a stirrer 2 and a liquid outlet leading via a pipe 3 to the inlet of a centrifugal pump 4, the outlet of which is connected to a pipe 5 discharging back into the vessel 1. A pipe 6 serves to introduce water at a measured rate to the inlet of the pump.

Alternatively water may be added at a measured rate to a saturating vessel, preferably fitted with an agitator, through which the solvent is passed on its way back to the contacting vessel and dissolves further water. If there is any tendency for the water to separate from the solvent a further separating vessel should be interposed between the saturating vessel and the contacting vessel and the separated water removed there to avoid the introduction of free water into the contacting vessel. A suitable apparatus is shown diagrammatically in FIGURE 2, and consists of an open contacting vessel 7 provided with a stirrer 8 and a liquid outlet leading via a pipe 9 to a circulating pump 10 the outlet of which leads to a saturating vessel 11 having a stirrer 12 and a water inlet 13. From the upper part of the saturating vessel a pipe 14 leads to a separating vessel 15 having an outlet at the bottom discharging through a pipe 16 back into the contacting vessel. A second outlet 17 at the top of the separating vessel serves to discharge separated liquid water.

The following two examples illustrate the use respectively of a solution and a dispersion of water to hydrate ion-exchange resin beads.

Example 1

One gram of azo-bis-isobutyronitrile was dissolved in a mixture of 300 cc. ethyl acrylate and 76 cc. commercial divinyl benzene concentrate and the mixture was polymerised in suspension in 1500 cc. 10% sodium chloride solution containing 15 gm. gelatine at 70–75° C. After 10 hours the hard polymer beads were filtered off and dried.

100 gm. of the beads were stirred for one hour with 500 cc. ethylene dichloride and then, while continuing to stir, 96 gm. sulphur trioxide were added over a period of 3–4 hours, the temperature being kept at 40° C. When all the sulphur trioxide had been added, the stirring was continued for a further one hour. The whole was then allowed to cool and the solid sulphonated polymer was drained from the liquid on a screen. The liquid was discarded. The polymer beads were suspended in about 1 litre of ethylene dichloride in an open contacting vessel fitted with a mechanical stirrer and having an outlet leading to a pump by which the solvent was continuously circulated through a saturating vessel having a stirrer and a water inlet, and thence through a separating vessel back to the contacting vessel, the whole apparatus being constructed as shown in FIGURE 2. The pump and stirrers were started and the addition of water to the saturating vessel was begun, so that a saturated solution of water in ethylene dichloride was circulated through the vessel containing the beads. The rate of addition of water to the saturating vessel was such that a weight of water approximately 1½–2 times the weight of the original polyacrylate beads was brought into contact with the resin over a period of about 20 hours.

The final ion-exchange resin beads were tested from time to time for completeness of hydration by removing a small sample of them and adding an excess of water. When it was complete, as shown by the absence of cracking, the resin was separated from the ethylene dichloride on a screen and either washed with acetone and then water, or boiled with water to remove the ethylene dichloride as an azeotrope.

The resulting beads were found to be substantially crack-free.

Example 2

The process of Example 1 was repeated up to the separation of the sulphonated polymer beads from the sulphonating mixture. The beads were then suspended in one litre of ethylene dichloride in an open contacting vessel fitted with a mechanical stirrer and having an outlet leading to the suction side of a centrifugal pump and thence directly back to the contacting vessel, the whole apparatus being constructed as shown in FIGURE 1. The pump and stirrer were started, and water was injected at the inlet of the pump to form and maintain an emulsion in the ethylene dichloride containing 0.5% water which was returned to the contacting vessel at the rate of 10 litres per hour. Hydration was found to be complete after 7 hours, and the resulting beads were substantially crack-free.

Another way of carrying out the hydration suitable for use with resin beads or particles is to immerse the resin bodies in a bath of the organic solvent and then spray water into the solvent while stirring the bath. Suitably the water is in the form of very fine droplets produced by an atomiser. The spray of water is preferably delivered on to the surface of the bath, but it may if desired be delivered beneath the surface. On the laboratory scale a scent spray has been found to be satisfactory for delivering the water on to the surface of the bath.

It is found that when this method is used the particle size of the water droplets used in the spraying technique is important. Some resins, for example, require very fine droplets, almost in the form of a fog, whereas other resins will tolerate droplets as large as a millimetre in diameter or even larger. In practice therefore it is advisable to start with the finest possible spray and then, if desired, try progressively larger droplets until it is found that cracking occurs.

Example 3

0.2 gm. benzoyl peroxide was dissolved in a mixture of 160 cc. styrene and 40 cc. of a 50% divinyl benzene concentrate and the mixture polymerised in suspension in 800 cc. of water containing 0.8 gm. polyvinyl alcohol at 80° C. After 8 hours the hard polymer beads were filtered off and dried.

These polymer beads were made into a slurry with ethylene dichloride. 700 cc. conc. $H_2SO_4$ was then added and the whole heated to 80° C. for 10 hours. The mixture was then cooled and the solid separated from the sulphonation liquid on a screen.

About 100 gm. of the solid was stirred with 500 cc. cyclohexanol while water was sprayed on to the surface in the form of a fog of fine droplets about 50 microns in diameter at the rate of about 1 cc. per minute. From time to time the resin was tested from completion of hydration as in Example 1 and when this was complete (after about 1½ hours), the resin was separated from the liquid on a screen and boiled with water to remove adhering cyclohexanol. The resin beads so obtained were almost wholly crack-free.

Similar results were obtained when the ethylene dichloride was replaced by methyl iso-butyl ketone.

Example 4

A further 100 gm. of the sulphonated product of Example 3 was stirred with 500 cc. ethylene dichloride and water run in as coarse droplets from a small "rose" having apertures about 0.5 mm. in diameter at the rate of about 100 cc. in 2 hours. After separating the beads and solvent and removing adhering solvent by boiling with water, the beads were found to be crack-free.

Example 5

As an example of the hydration of a resin containing phosphonic acid groups, a mixture of 65 gm. anhydrous aluminium chloride, 130 cc. phosphorus trichloride and 300 cc. ethylene dichloride was heated under reflux for 6 hours with 42 gm. of cross-linked polymer beads made by suspension polymerisation of a mixture of 96 parts styrene and 4 parts divinyl benzene. The product was separated from the reaction mixture and suspended in 300 cc. nitromethane while water was sprayed on to the surface in the form of a fog of fine droplets at the rate of about 1 cc. per minute. Hydration was found to be complete in about 2 hours, and the solid was then separated from the liquid, washed with acetone and then with water. It was finally boiled with 20% caustic soda solution to hydrolyse the —$POCl_2$ groups to —$PO(OH)_2$ groups. The product was washed with water and was found to be almost wholly crack-free.

As an illustration of the tendency of some resins to crack if too large droplets are used in this technique, Examples 3 and 4 were repeated using the resin of Example 1. It was found that while a crack-free product was obtained when using a fog of fine droplets of water, the use of the larger droplets as in Example 4 led to extensive cracking.

It may not be necessary to introduce the whole of the water needed for complete hydration by the process according to the invention, as it may be possible to complete the hydration with water without risk of the resin cracking.

I claim:

1. A process of hydrating a substantially water-free ion-exchange resin which comprises maintaining the resin which is produced under substantially anhydrous conditions and which cracks upon immersion in water prior to its use in an ion-exchange process in contact with a water-containing inert organic solvent until it is substantially hydrated.

2. A process according to claim 1 in which the solvent is circulated through a vessel containing the resin and water is added to the solvent while it is not in contact with the resin.

3. A process according to claim 2 in which the resin is in the form of particles which are suspended in the solvent.

4. A process according to claim 2 in which the solvent is caused to flow through a column of resin particles.

5. A process according to claim 1 in which water is added in the form of a spray to an agitated bath of the solvent in which the resin is suspended.

6. A process according to claim 1 in which the water is dissolved in the solvent.

7. A process according to claim 1 in which the solvent also contains an emulsifying agent and the water is present in the solvent in the form of an emulsion.

8. A process according to claim 1 in which the solvent is ethylene dichloride.

9. In the production of bodies of ion-exchange resin by introducing ion-exchange groups into pre-formed bodies of organic polymer by reaction under essentially non-aqueous conditions, the steps of separating the bodies in substantially water-free condition prior to their use in an ion-exchange process from the reaction mixture and maintaining them in contact with a water-containing inert organic solvent until they are substantially hydrated.

10. A process according to claim 9 in which the solvent is ethylene dichloride.

11. A process according to claim 2 in which the solvent is ethylene dichloride.

12. A process according to claim 3 in which the solvent is ethylene dichloride.

13. A process according to claim 4 in which the solvent is ethylene dichloride.

14. A process according to claim 5 in which the solvent is ethylene dichloride.

15. A process according to claim 6 in which the solvent is ethylene dichloride.

16. A process according to claim 7 in which the solvent is ethylene dichloride.

References Cited in the file of this patent

Osborn: "Synthetic Ion Exchangers," pages 3 and 4, Chapman and Hall, London (1955).

Abrams: Ind. Eng. Chem., 48, 1469–1472 (September 1956).